United States Patent
Korshunov et al.

(10) Patent No.: US 7,358,010 B2
(45) Date of Patent: Apr. 15, 2008

(54) FLUORINATED CARBON FOR METAL/FLUORINATED CARBON BATTERIES

(75) Inventors: Geliard Mikhailovich Korshunov, Moscow region (RU); Natalya Vladimirovna Polyakova, Moscow region (RU); Vladimir Alexandrovich Vulf, Moscow region (RU); Vladimir Yuryevich Zakharov, Kirov region (RU)

(73) Assignee: LODESTAR Inc., Howell, NJ (US)

( * ) Notice: Subject to any disclaimer, the term of this patent is extended or adjusted under 35 U.S.C. 154(b) by 421 days.

(21) Appl. No.: 10/465,606

(22) Filed: Jun. 20, 2003

(65) Prior Publication Data

US 2004/0013933 A1    Jan. 22, 2004

Related U.S. Application Data

(60) Provisional application No. 60/397,101, filed on Jul. 22, 2002.

(51) Int. Cl.
*H01M 4/58* (2006.01)

(52) U.S. Cl. ............... 429/231.7; 429/231.8; 429/232; 429/231.95; 429/231.9; 429/337; 429/333; 429/330; 429/340

(58) Field of Classification Search ............. 429/231.7, 429/231.8, 232, 231.95, 231.9, 337, 333, 429/330, 340
See application file for complete search history.

(56) References Cited

U.S. PATENT DOCUMENTS

| 4,485,156 A | 11/1984 | Tokunaga |
| 4,753,786 A | 6/1988 | Watanabe et al. |

FOREIGN PATENT DOCUMENTS

| DE | 198 46 015 A1 | 4/1999 |
| EP | 0 395 100 A2 | 4/1990 |
| EP | 0 573 266 A1 | 1/1993 |
| JP | 57-84570 * | 5/1982 |
| JP | 1282325 | 11/1989 |

* cited by examiner

*Primary Examiner*—Laura Weiner
(74) *Attorney, Agent, or Firm*—Isaac A. Angres

(57) ABSTRACT

A novel cathode composition for use in a metal/fluorinated carbon battery is produced by mixing fluorinated carbons made from anisotropic and isotropic carbon, where the anisotropic carbon is carbon fiber and the isotropic carbon is graphite. This cathode composition has higher specific capacity and higher discharge rate capability than commonly used industrial products made using fluorinated petroleum cokes or similar materials. In addition this composition undergoes much less swelling (increase in volume) during discharge when compared with the commonly used fluorinated carbon.

13 Claims, No Drawings

FLUORINATED CARBON FOR METAL/FLUORINATED CARBON BATTERIES

This regular U.S. application is based on and claims the benefit of U.S. Provisional patent application Ser. No. 60/397,101 filed Jul. 22, 2002, the entire disclosure of which is relied upon and incorporated by reference herein.

FIELD OF INVENTION

The present invention relates to an improved fluorinated carbon ($CF_x$) materials and mixtures thereof useful in the manufacture of batteries. This invention relates to a novel electric current-producing cell. More particularly, this invention relates to improvements in the electric current producing cells of the type comprising an alkali metal anode, a cathode of a fluorinated carbon material, and an electrolyte. More particularly, the invention relates a novel cathode composition composed of fluorinated carbons, made by mixing fluorinated anisotropic carbon and fluorinated isotropic carbon, where the anisotropic carbon is carbon fiber and the isotropic carbon is graphite. Such a composition is useful as a cathode active material in non-aqueous batteries with active metal anodes, such as lithium, sodium or potassium. The novel composition has higher specific capacity and higher discharge rate capability than commonly used industrial products based on fluorinated petroleum cokes or similar materials. In addition cathodes made with this composition undergo no swelling during discharge (no increase in cathode volume) when compared with cathodes made with the commonly used fluorinated carbon or cathodes made solely with fluorinated carbon fiber. Using a fluorinated carbon material that does not swell during discharge allows the battery manufacturer to increase the amounts of active materials per unit volume, thus increasing the overall energy and lifetime of the battery. The present invention also relates to biomedical devices powered by non-aqueous lithium batteries which incorporate a fluorinated carbon material which does not swell during discharge of the battery. The invention also generally relates to electrochemical cells for use in powering implantable medical devices.

BACKGROUND OF THE INVENTION

The active materials for a positive electrode of an electric cell of high performance are typically required to have a high electromotive force, a high open circuit voltage and, in addition, a small overvoltage on discharge, a good flat characteristic on the discharge curve and a large discharge capacity per unit weight when they are used in combination with an appropriate negative electrode. Furthermore, the active materials are required to be neither decomposed nor dissolved in the electrolyte of an electric cell and they also have to be stable for a long period of time.

Fluorinated carbon materials having the general chemical formula $(CF_x)_n$, where x is a number between 0 and 2 and n is an indefinite number greater than 2, have been known to be useful as cathode materials for lithium batteries and also have been used in lubricating applications. $(CF_x)_n$ hereinafter is abbreviated as $CF_x$ for purposes of the present specification. Fluorinated carbon is prepared by the reaction of fluorine gas with many of the various forms of carbon, including graphite, petroleum coke, coal coke, carbon black, or carbon fiber. The reaction between fluorine and carbon is carried out at temperatures ranging from 250° C. to 600° C. and the reaction time is usually in the range of 1 to 24 hours.

It has been know for quite some time that fluorinated carbon compounds can be used as active cathode materials in non-aqueous batteries. Particular interest has centered on systems employing this cathode material, a non-aqueous electrolyte and a highly active metal anode such as lithium or sodium. As an example of such a system, Braeuer et al. have disclosed in U.S. Pat. No. 3,514,337 a high energy density battery composed of $CF_x$, where x is in the range 0.1 to 0.28. In the Watanabe, et al., U.S. Pat. No. 3,536,532 the patentees describe a high energy density battery utilizing $CF_x$ where x falls in the range of 0.5 to a maximum of 1. The fluorinated carbon cathode material prepared from crystalline carbon (e.g., graphite), exhibited higher energy densities and improved discharge performance when compared to the material described by Braeuer. An additional disclosure by Watanabe, et al., in U.S. Pat. No. 3,700,502 describes a high energy density system employing fluorinate carbon of the type $CF_x$ wherein x is in the range of greater than 0 and up to 1 and is prepared from carbon sources such as charcoal, activated carbon or coke. These batteries exhibited extended shelf life due to the stability of the fluorinated carbon in the electrolyte. In both of these systems, the electrolyte was a non-aqueous solution of an organic solvent (i.e. propylene carbonate and the like) and lithium perchlorate. The anode active material is an alkali metal such as lithium or sodium.

Another battery, which is composed, of fluorinated carbon having an x value of greater than 1 and up to and including 2 is described in Gunther U.S. Pat. No. 3,892,590. The materials of that patent are described as exhibiting higher energy densities than the prior art due to the increased fluorine content.

In U.S. Pat. No. 4,271,242, Toyoguchi, et. al. disclose the use of fluorinated carbons obtained by fluorinating carbon having a lattice constant of 3.40-3.50 A in its (002) plane. The carbon is selected from among petroleum cokes and coal cokes and the resulting battery has excellent discharge and shelf life characteristics. The fluorinated carbon materials described in this patent are generally accepted as the industry standard for lithium batteries employing fluorinated carbon cathodes and such materials are widely used in commercial battery production.

In the Russian Journal of Electrochemistry Vol. 36 No. 12, 2000, p 1325 Zhorin and Smirnov evaluated the performance of several types of fluorinated carbons including fluorinated carbon black, fluorinated coke and fluorinated carbon fiber. Their results show that fluorinated coke is superior to fluorinated carbon fiber. But these authors did not recognize the advantages of using a mixture of fluorinated carbons produced from anisotropic and isotropic carbon, where the anisotropic material is carbon fiber and the isotropic material is graphite.

Additionally, it is known that a wide range of implantable electronic devices are provided for surgical implantation into humans or animals. One common example is the cardiac pacemaker. Other examples of implantable devices include devices for stimulating or sensing portions of the brain, spinal cord, muscles, bones, nerves, glands or other body organs or tissues. Implantable devices are becoming more and more complex and commonly include sophisticated data processing hardware such as microprocessors, memory devices, or other large scale integration (LSI) devices. Often, the devices are designed for transmitting signals to remote sensing devices. With the increase in the sophistication of implantable devices and in particular with the need to reliably transmit signals to sensors external to the body, the need for improved power cells for powering the implantable devices has increased greatly. There are, of course, limitations on the design and configuration of power cells for use in implantable devices, especially with regard to the size and shape thereof. Moreover, the power cells for the implantable devices must be highly reliable and be capable of providing an adequate amount of current and voltage for an extended period of time.

The present inventors have, therefore, made extensive studies to develop active materials of a fluorine type for the positive electrode of an electric cell having high performance and, as a result, have found active materials for the positive electrode which not only almost perfectly satisfy the above described requisites for the positive-electrode active materials of an electric cell of high performance, but also exceed conventional active materials for the positive-electrode in various performances for the electric cell.

The prior art is silent regarding a cathode composition comprised of a mixture of fluorinated carbons produced from anisotropic and isotropic carbons, where the anisotropic material is carbon fiber and the isotropic material is graphite. Applicants' have discovered that such a mixture offers substantial improvements in discharge characteristics over prior art fluorinated carbon electrode compositions when used as an active cathode material in a non-aqueous battery. The prior art is also silent regarding the use of batteries containing the novel fluorinated materials of the invention in biomedical applications including implantable devices.

OBJECTS OF THE INVENTION

Accordingly, it is one and a principal object of the invention to provide a novel composition of fluorinated carbons having excellent properties for industrial applications.

It is another object of the present invention to provide a composition of fluorinated carbons useful as cathode material.

It is still another object of the present invention to provide a composition composed of fluorinated carbons, made by mixing fluorinated anisotropic carbon and fluorinated isotropic carbon.

It is further object of the present invention to provide a cathode material composed of fluorinated carbons, made by mixing fluorinated anisotropic carbon and fluorinated isotropic carbon.

It is still a further object of the present invention to provide a composition composed of fluorinated carbons, made by mixing fluorinated anisotropic carbon and fluorinated isotropic carbon, where the anisotropic carbon is carbon fiber and the isotropic carbon is graphite.

An additional object of the invention is a cathode composition composed of fluorinated carbons, made by mixing fluorinated anisotropic carbon and fluorinated isotropic carbon, where the anisotropic carbon is carbon fiber and the isotropic carbon is graphite.

Another important object of the invention is a non-aqueous battery containing an alkali metal anode and a cathode composition composed of fluorinated carbons, made by mixing fluorinated anisotropic carbon and fluorinated isotropic carbon, where the anisotropic carbon is carbon fiber and the isotropic carbon is graphite.

A still important object of the invention is to provide biomedical and implantable devices using the batteries of the present invention.

The foregoing and other objects, and features of the present invention will be apparent to those skilled in the art from the following detailed description.

SUMMARY OF THE INVENTION

The present invention is directed to composition of matter comprising a mixture of fluorinated anisotropic carbon and fluorinated isotropic carbon.

The invention is also directed to composition of matter comprising a mixture of fluorinated anisotropic carbon and fluorinated isotropic carbon wherein said fluorinated anisotropic carbon is present in an amount from 0.1% to 99.9% and said fluorinated isotropic carbon is present in an amount from 0.1% to 99.9%.

The invention further relates to a high energy density battery comprising: (a) an anode electrode having as the active material an electrochemically active metal; (b) a non-aqueous liquid electrolyte; and (c) a cathode electrode which comprises as its principal active material a mixture of fluorinated anisotropic carbon and fluorinated isotropic carbon.

The instant invention also provides an electrochemically active cathode composition comprising a mixture of fluorinated anisotropic carbon and fluorinated isotropic carbon and an effective amount of an electrically conductive material.

The present invention also provides electrochemically active composition comprising a mixture of fluorinated anisotropic carbon and fluorinated isotropic carbon and an effective amount of an electrically conductive material wherein said fluorinated anisotropic carbon is present in an amount from 0.1% to 99.9% and said fluorinated isotropic carbon is present in an amount from 0.1% to 99.9%.

The invention further provides biomedical implantable devices powered by a battery comprising: (a) an anode electrode having as the active material an electrochemically active metal; (b) a non-aqueous liquid electrolyte; and (c) a cathode electrode which comprises as its principal active material a mixture of fluorinated anisotropic carbon and fluorinated isotropic carbon.

DESCRIPTION OF THE PREFERRED EMBODIMENTS

This invention relates a novel cathode composition composed of fluorinated carbon, made by mixing fluorinated anisotropic carbon and fluorinated isotropic carbon, where the anisotropic carbon is carbon fiber and the isotropic carbon is graphite. The novel cathode composition is then used in a high energy density non-aqueous battery, which exhibits superior electrochemical properties. The novel cathode composition permits the provision of a novel high-energy non-aqueous battery comprising an anode, an organic electrolyte solution, and a cathode. The cathode composition of the invention when used in combination with a lithium anode minimizes and even eliminates the swelling behavior of the cells.

In the practice of this invention the novel cathode composition composed of fluorinated carbon is made by thoroughly mixing fluorinated anisotropic and fluorinated isotropic carbons. The mixture may contain between 0.1%-99.9% by weight of fluorinated carbon made from anisotropic carbon and 0.1%-99.9% by weight of fluorinated carbon made from isotropic carbon. More preferably, the mixture may contain between 60% and 90% by weight of fluorinated carbon made from anisotropic carbon and the remainder (10% to 40% weight) is fluorinated carbon made from isotropic carbon. Most preferably, the mixture may contain between 70% and 95% by weight of fluorinated carbon made from anisotropic carbon and the remainder (5% to 30% weight) is fluorinated carbon made from isotropic carbon.

The fluorinated carbon made from anisotropic carbons is preferably made by the fluorination of carbon fiber and, most preferably, by the fluorination of carbon fibers made by the carbonization of viscose rayon polymer fibers or cloth. Fluorinated fibers are produced by the reaction of carbon fiber with fluorine gas at temperatures up to 600° C. and reaction times between 1 and 24 hours. After fluorination, the fibers are ground and sieved to give a powder with a median particle size in the range of 4 to 15 microns and a maximum particle size of 45 microns.

The fluorinated carbon made from isotropic carbons is preferably made by the fluorination of natural graphite or synthetic graphite and, most preferably, by the fluorination of natural graphite. These fluorinated carbons are made by the reaction of natural graphite or synthetic graphite with fluorine gas at temperatures up to 600° C. and reaction times between 1 and 24 hours. The starting carbonaceous materials (natural graphite or synthetic graphite) are ground prior to fluorination and the resultant fluorinated carbon should have a median particle size of 4 to 15 microns and a maximum particle size not greater than 45 microns.

Before fabrication into an electrode for incorporation into an electrochemical cell, the novel fluorinated active material of the present invention is preferably mixed with a conductive additive. Suitable conductive additives include acetylene black, carbon black and/or graphite. Metals such as nickel, aluminum, titanium and stainless steel in powder form are also useful as conductive diluents when mixed with the above listed active materials. The electrode further comprises a binder material which is preferably a fluororesin powder such as powdered polytetrafluoroethylene (PTFE) or powdered polyvinylidene fluoride (PVDF). Additional active materials which are useful in an electrochemical cell according to the invention include silver vanadium oxide, manganese dioxide, lithium cobalt oxide, copper sulfide, iron sulfide, iron disulfide, copper vanadium oxide, and mixtures thereof. The preferred cathode active mixture comprises a mixture of fluorinated anisotropic carbon and fluorinated isotropic carbon combined with acetylene black and/or graphite, and PTFE.

The electrodes of the invention using the novel fluorinated composition of the invention can be manufactured according to Shia U.S. Pat. No. 4,556,618. For example, in preparing the electrically active fluorinated carbon electrode, the initial components, comprising the mixture of fluorinated anisotropic carbon and fluorinated isotropic carbon, i.e. the active cathode material preferably supplemented with a minor amount of a conductivity enhancing material and the fibrillatable polymer such as polytetrafluoroethylene, are subjected to a shearing process by a dry processing technique. This transforms the components to a material composed of discrete fibers throughout an intimate mixture comprising the active material, (conductive carbon) components. These materials can be blended together initially, e.g., in a blender such as a Banbury mixer or a ball mill, and then processed to form the shaped electrode article, e.g., in an extruder. Alternatively, the components can be mixed with each other and processed in various sequences depending on the desired ultimate electrode configuration and the equipment used to introduce porosity into the blend. During the processing, the blend is thoroughly wet with a suitable liquid pore-former that is readily removable without leaving an adverse impact on the blend or the condition of the shaped article, such as a suitable alcohol/or mixture, e.g., isopropanol-water mixture. Suitable pore forming liquids are generally those that may be volatilized by conventional means at temperatures between 50° C. and 250° C. and preferably between 70° C. and 150° C. By removal of the pore-former, the precursor electrode composition is converted to the desired electrode system. Advantageously, conversion of the fibrillatable polymer to the described fibrous condition is carried out in-situ. By conversion in-situ is meant that it is fibrillated in the presence of at least one of the components of the system, e.g., the active material.

The electrode system or precursor electrode composition can be formed as pellets and the pellets can be converted to the desired shaped electrode by conventional polymer processing techniques, e.g., extrusion, molding, blowing or combinations thereof. As indicated above, with appropriate choice of processing technique, the components can be processed from a dry powder mixture which is then thoroughly wetted with the pore-forming liquid and formed directly to a sheet or bat. The pore forming volatile liquid is conveniently extracted in the course of forming the components into the desired shaped electrode. The thickness of the sheet or bat can be varied and the electrode material can be produced directly as a flexible sheet or film. Alternatively, for example, it can be made into pellets and the pellets extruded and blown to a film or the pellets can be injection molded to a film.

Typically, suitable electrode system can be made of about 1 to several hundred mils thick. Porosity and conductivity of the electrode system can be controlled, e.g., with appropriate use of pore-formers and processing parameters. The bound electrode composition can be processed immediately or stored in a dry state and then it can be thoroughly wetted with the pore forming liquid which is then removed during the electrode shaping process or by controlled heating, for example. The electrode can be made as a flexible film in any desired thickness, and it can be easily combined with a current collector such as a conductive film, wire screen or expanded metal.

The present invention also provides a high energy density battery comprising: (a) an anode electrode having as the active material an electrochemically active metal; (b) a non-aqueous liquid electrolyte; and (c) a cathode electrode which comprises as its principal active material a mixture of fluorinated anisotropic carbon and fluorinated isotropic carbon.

The highly active anodes for use in non-aqueous systems employing the novel cathode composition according to this invention would be consumable metals and include aluminum, the alkali metals, alkaline earth metals and alloys of alkali metals or alkaline earth metals. The term "alloys" as used herein and in the appended claims is intended to include mixtures, solid solutions, such as lithium-magnesium, and the intermetallic compounds, such as lithium monoaluminide. The preferred anode materials are lithium, sodium, potassium, calcium, magnesium, and alloys thereof. Of the preferred anode materials, lithium would be the best because, in addition to being a ductile metal that can be easily assembled in a cell, it possesses the highest energy-to-weight ratio of the group of suitable anodes.

The electrochemical cell of the present invention further includes a nonaqueous, ionically conductive electrolyte which serves as a medium for migration of ions between the anode and the cathode electrodes during the electrochemical reactions of the cell. The electrochemical reaction at the electrodes involves conversion of ions in atomic or molecular forms which migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

Organic solvents are used in the preparation of the electrolyte and are well known to those skilled in the art. These solvents can include the following classes of compounds: lactones, alkylene carbonates, lactams, polyethers, cyclic ethers, cyclic sulfones, dialkylsulfites, monocarboxylic acid esters, and alkylnitriles. Typical preferred solvents from the above categories include γ-butyrolactone, propylene carbonate, N-methylpyrrolidone, 1,1- and 1,2-dimethoxyethane, tetrahydrofuran, methyl tetrahydrofuran, sulfolane, dimethylsulfite, diethylsulfite, ethyl or methyl acetate, methyl formate, and acetonitrile.

Other solvents of interest include sulfolane; 3-methyl sulfolane, gamma-valerolactone, crotonitrile, nitrobenzene, 1,3-dioxolane, 3-methyl-2-oxazolidone, ethylene carbonate; ethylene glycol sulfite; dimethyl sulfoxide, acetonitrile, dimethyl formamide, diglyme, triglyme, tetraglyme, dimethyl carbonate (DMC), 1,2-diethoxyethane (DEE), diethyl carbonate, and dimethyl acetamide, and mixtures thereof.

The above solvents may be used alone or in mixtures. Of the above, the preferred solvents are gamma-butyrolactone, propylene carbonate, dimethylsufite, and 1,2-dimethoxyethane. Of these, the most preferred are mixtures of 1,2-dimethoxyethane/propylene carbonate and gamma-butryrolactone.

The electrolyte salts for use in the application of this invention are selected from those salts that will produce an ionically conductive solution in the organic solvents cited above. Useful electrolytes include $LiBF_4$, $LiAsF_6$, $LiPF_6$, $LiClO_4$, and $Li(SO_3CF_3)$. The only requirements for utility are that the salts, whether simple or complex, be compatible with the solvent or solvents being employed and that they yield a solution which is of sufficient ionic conductivity. According to the Lewis or electronic concept of acids and bases, many substances which contain no active hydrogen can act as acids or acceptors of electron doublets. The basic concept is set forth in the chemical literature (Journal of the Franklin Institute, Vol. 226-July/December, 1938, pages 293-313 by G. N. Lewis).

In order to prevent internal short circuit conditions, the cathode is separated from the Group IA, IIA or IIIB anode material by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include fabrics woven from polypropylene and fluoropolymeric fibers including polyvinylidene fluoride, polyethylenetetrafluoroethylene, and polyethylene-chlorotrifluoroethylene used either alone or laminated with a fluoropolymeric microporous film, non-woven glass, polypropylene, polyethylene, glass fiber materials, ceramics, poly-tetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.).

A preferred separator comprises a non-woven polypropylene fabric or cloth and a superimposed polypropylene film or membrane. Preferably, the non-woven fabric faces the cathode and the polypropylene microporous film faces the anode. That way, the non-woven layer acts as a wicking material to more effectively wet the cathode and serves as a barrier to puncture of the polypropylene film from loose carbon particles.

The preferred form of the electrochemical cell is a case-negative design wherein the anode/cathode couple is inserted into a conductive metal casing such that the casing is connected to the anode current collector. The casing is designed depending on the particular form factors required and final application. Cylindrical i.e., C, D and AA cell sizes and prismatic configurations are preferred. A preferred material for the casing is titanium although stainless steel, mild steel, nickel, nickel-plated mild steel and aluminum are also suitable. The casing header comprises a metallic lid having a sufficient number of openings to accommodate the glass-to-metal seal/terminal pin feedthrough for the cathode electrode. The anode electrode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed such as by close-welding a stainless steel plug over the fill hole, but not limited thereto. The cell of the present invention can also be constructed in a case-positive design.

The novel cathode composition of the instant invention is particularly useful for biomedical devices especially since they don't swell during discharge. The novel composition has higher specific capacity and higher discharge rate capability than commonly used industrial products based on fluorinated petroleum cokes or similar materials. In addition cathodes made with this composition undergo no swelling during discharge (no increase in cathode volume) when compared with cathodes made with the commonly used fluorinated carbon or cathodes made solely with fluorinated carbon fiber.

The invention further provides biomedical devices powered with the batteries of the instant invention. For example, cardiac pacemakers and defibrillators known in the prior art and can be powered with the batteries of the instant invention. Additionally, insulin pumps and neurostimulators as well as any implantable device can be powered with the batteries of the instant invention.

The several features and advantages of the invention will be apparent in greater detail by the following examples. It will be understood, however, that although these samples may describe in detail certain preferred conditions of the invention, they are given primarily for purposes of illustration and the invention in its broad aspects is not limited thereto.

EXAMPLES

Example 1

Preparation of Cathode

Cathodes were made with three types of fluorinated carbon, fluorinated petroleum coke (commonly used for commercial battery production), fluorinated carbon fiber, and a mixture of an anisotropic carbon of fluorinated viscose rayon fiber with 5% by weight an isotropic carbon of fluorinated natural graphite. The fluorinated carbon fiber was prepared by the fluorination of carbonized viscose rayon cloth.

| Fluorinated carbon type | Composition |
|---|---|
| PC/10 | Fluorinated petroleum coke |
| F | Fluorinated carbon fiber |
| FN | Fluorinated carbon fiber mixed with 5% by weight fluorinated graphite |

To prepare the cathodes, 0.3 g of the fluorinated carbon, 0.056 g acetylene black as a conductive additive, 0.019 g fluoropolymer water emulsion as binding agent were carefully mixed using the following procedure. First the fluorinated carbon sample (PC/10, F, or FN) was carefully mixed with acetylene black, then ethyl alcohol was added to the mixture (1 part of mixture: 2 parts of alcohol) and then the fluoropolymer emulsion was added. The cathode mixture was mixed well and pressed to remove excess liquids. Then a button-shaped article was made by pressing a controlled amount of the material into the battery case The diameter of the button is 17 mm and the thickness is 1 mm. The material was dried for 1 hour at 80° C. and then dried in vacuum at 350° C. for 1 hour.

Preparation of the Battery and Testing

The test batteries were constructed in a dry, argon atmosphere chamber. A total of nine batteries of each cathode type were made. Lithium metal was used as the anode and the batteries were prepared with excess lithium to insure that the anode did not limit discharge performance. A button of lithium metal (diameter 17 mm, thickness 0.5 mm) was pressed into the battery case. The electrolyte, a 1M solution of lithium tetrafluoroborate in gamma-butyrolactone was added to the battery case containing the cathode and a polypropylene separator was placed on top of the cathode. The batteries were then carefully sealed and allowed to equilibrate for a few days. Then the batteries were discharged using constant loads and the average values for each three-battery group are shown below. All discharges were carried out to a 2 V cutoff.

Discharge characteristics of fluorinated carbons

| Fluorinated Carbon | Discharge current, mA | Discharge time, hr. | Specific capacity, mAh/g |
|---|---|---|---|
| Type F | 1 | 244.00 | 815 |
|  | 4 | 52.80 | 704 |
|  | 8 | 22.85 | 608 |
| Type FN | 1 | 251.00 | 823 |
|  | 4 | 54.50 | 726 |
|  | 8 | 26.50 | 636 |
| Type PC/10 | 1 | 210.00 | 710 |
|  | 4 | 48.00 | 630 |
|  | 8 | 20.00 | 533 |

Data is an average of three cells for each type and each discharge rate

From the above data it is clear the type FN fluorinated carbon (composed of 95% by weight fluorinated carbon fiber and 5% by weight fluorinated graphite) gives the best performance. Type FN fluorinated carbon delivers 15% to 19% greater capacity compared to Type PC/10 and up to 5% greater capacity compared to the Type F fluorinated carbon.

Example 2

Cathodes were made using the method described in U.S. Pat. No. 4,556,618. The fluorinated carbon (either type PC/10, F, or FN) was mixed with carbon black and powdered tetrafluoroethylene resin in the ratio 10:2:1 parts, respectively. The three powders were thoroughly mixed using a mortar and pestle until uniform. Then, an isopropanol/water solution (70:30) was added to wet the mixture. The wet material was place in a pressing die and compressed, then the resulting disc was cut in half and pressed again in the same die. The resulting disc was placed on to an aluminum grid and roll-pressed between two sheets of Mylar. Then, the material was vacuum dried and cut with a cutting dye to give the desired diameter.

Batteries were constructed using 2032 coin battery cases. The fluorinated carbon cathode was place on the bottom of the battery case, and then a separator was placed over the cathode. Electrolyte (propylene carbonate—dimethoxy ethane with $LiBF_4$) was added to the separator and a lithium electrode was place on top. A metal plate was place on top of the lithium electrode followed by a spring washer to maintain good contact and even pressure on the cathode and anode. The batteries were designed to be cathode limited (i.e., with excess lithium) and were constructed in a dry atmosphere chamber.

The thickness of each cathode was accurately measured before and after discharge. Since changes in diameter of the cathodes was restricted by the design of the cell case, only the thickness of the cathode could change during discharge. The following data shows the volumetric changes that were measure before and after discharge for cathodes made with three different types of fluorinated carbon. The batteries were discharged at a constant current of 1 mA to a 2 volt cut off.

Change in cathode volume and density after discharge

| Type of fluorinated carbon | Change in cathode volume, % | Change in cathode density, % |
|---|---|---|
| PC/10 | 76 | −43 |
| F | 36 | −26 |
| FN | −15 | 18 |

Data is an average of three cells for each type

The data in the table above clearly shows that fluorinated carbon type FN (mixture of fluorinated carbon fiber with 5% by weight of fluorinated natural graphite) does not undergo any change in volume during discharge. In fact, the volume of the cathodes made with the type FN decrease in volume and increase in density. Spring washers that were used in the test batteries to maintain constant pressure caused the decrease in cathode volume (and increase in cathode density) observed with the type FN cathodes. The other materials, fluorinated fiber (type F) and fluorinated petroleum coke (type PC/10), both show an increase in cathode volume (swelling) after discharge and a decrease in cathode density.

It is understood that all equivalent features are intended to be included within the claimed contents of this invention. Although the present invention has been described with reference to specific details of certain embodiments thereof, it is not intended that such detail should be regarded as limitations upon the scope of the invention, except as and to the extent that they are included in the accompanying claims.

We claim:

1. A high energy density battery comprising: (a) an anode electrode having as the active material an electrochemically active metal; (b) a non-aqueous liquid electrolyte; and (c) a cathode electrode which comprises as its principal active material a mixture of: (i) a fluorinated anisotropic carbon of fluorinated carbon fibers, wherein said carbon fibers are made by carbonization of viscose rayon polymer fibers or cloth; with (ii) 5% by weight of a fluorinated isotropic carbon of fluorinated graphite and wherein said cathode electrode does not exhibit swelling upon discharge of said battery.

2. The battery of claim 1, wherein the fluorinated isotropic carbon is fluorinated natural graphite.

3. The battery of claim 2, wherein the fluorinated isotropic carbon is fluorinated natural graphite made by the fluorination of natural graphite.

4. The battery of claim 1 wherein the non-aqueous electrolyte comprises a solution of a lithium salt and an organic solvent selected from the group consisting of lactones, alkylene carbonates, lactams, polyethers, cyclic ethers, cyclic sulfones, dialkylsulfites, monocarboxylic acid esters, and alkylnitriles.

5. The battery of claim 4 wherein the organic solvent is gamma-butyrolactone.

6. The battery of claim 4 wherein the organic solvent is a mixture of dimethoxyethane and propylenecarbonate.

7. The battery of claim 4 wherein the organic solvent is dimethylsulfite.

8. The battery of claim 4 wherein said lithium salt is selected from the group consisting of lithium tetrafluoroborate, lithium perchlorate, lithium hexafluoroarsenate, lithium trifluoro-methane sulfonate, and mixtures thereof.

9. The battery of claim 1 wherein the active metal anode is selected from the group consisting of lithium, potassium and sodium.

10. The battery of claim 1 wherein the active metal anode is lithium.

11. An electrochemically active cathode composition comprising a mixture of: (i) a fluorinated anisotropic carbon of fluorinated carbon fibers, wherein said carbon fibers are made by carbonization of viscose rayon polymer fibers or cloth; with (ii) 5% by weight of a fluorinated isotropic carbon of fluorinated graphite and an effective amount of an electrically conductive material and wherein said cathode composition does not exhibit swelling upon discharge.

12. A biomedical implantable device powered by a battery comprising: (a) an anode electrode having as the active material an electrochemically active metal; (b) a non-aqueous liquid electrolyte; and (c) a cathode electrode which comprises as its principal active material a mixture of: (i) a fluorinated anisotropic carbon of fluorinated carbon fibers, wherein said carbon fibers are made by carbonization of viscose rayon polymer fibers or cloth; with (ii) 5% by weight of a fluorinated isotropic carbon of fluorinated graphite and wherein said cathode electrode does not exhibit swelling upon discharge of said battery.

13. The biomedical device of claim 12 which is selected from the group consisting of implantable cardiac pacemakers, defibrillators, insulin pumps and neurostimulators.

* * * * *